United States Patent [19]

Pauletich

[11] 3,944,019

[45] Mar. 16, 1976

[54] DEEP WATER SOUND IMPLODER

[76] Inventor: Joseph Pauletich, 91-18 43rd Ave., Elmhurst, N.Y. 11373

[22] Filed: June 20, 1974

[21] Appl. No.: 481,068

[52] U.S. Cl. .............................. 181/120; 181/115
[51] Int. Cl.² .......................................... G01V 1/04
[58] Field of Search ........... 181/118, 120, 113, 114, 181/108; 340/17

[56] References Cited
UNITED STATES PATENTS

| | | | |
|---|---|---|---|
| 3,434,561 | 3/1969 | Loper | 181/118 |
| 3,712,408 | 1/1973 | Muniz | 181/120 |

FOREIGN PATENTS OR APPLICATIONS

| | | | |
|---|---|---|---|
| 826,932 | 1/1960 | United Kingdom | 181/120 |

Primary Examiner—Richard A. Farley
Assistant Examiner—H. A. Birmiel

[57] ABSTRACT

An underwater sound imploder adapted for use in the exploration of minerals existing under the sea bed. The imploder consists of three main units, a boiler, a heat shield therefor and a bell shaped sonic device to which the boiler has delivered superheated steam. Expansion of the steam under water pressure causes the implosion. The steam condensate is pumped back into the boiler where it is recycled. The implosions occur repeatedly in the device thereby causing a succession of sonic impulses to pass through the water medium and return as echoes for detection and analysis to determine thereby the character of the reflecting object in the sea bed.

8 Claims, 4 Drawing Figures

DEEP WATER SOUND IMPLODER

The invention relates to underwater sonic devices and, in particular, to such devices which create the sound by implosions and are adapted for use in relatively deep water.

The present assembly is adapted for suspension in ocean depths from surface vessels and, as distinct from prior art devices, provides underwater the means for creating the particular agency which produces the sound, in this case superheated steam. These means include a boiler assembly and heat shield which serve together to produce the steam. The steam is delivered to the water medium within the imploder itself which is shaped in the form of a bell open at the bottom to permit expansion of the steam bubble until water pressure causes it to burst against the sides of the imploder causing it to vibrate and thereby produce the desired sound waves. Each mineral has a unique resonant frequency and on impact within the ocean bed produces a distinct echo the frequency of which can be detected and recorded aboard the vessel supporting the imploder where it can be analyzed so as to identify the particular mineral or other material which is the cause of the echo.

One object of the invention is to provide an underwater sound imploder which is efficient to operate at substantial depths yet of sufficient size to produce the imploded sound which will carry relatively great distances under water and through the bottom of the ocean or other body of water.

Other objects and advantages of the invention may be appreciated on reading the following description of one embodiment thereof which is taken in conjunction with the accompanying drawings, in which.

Figure 1:
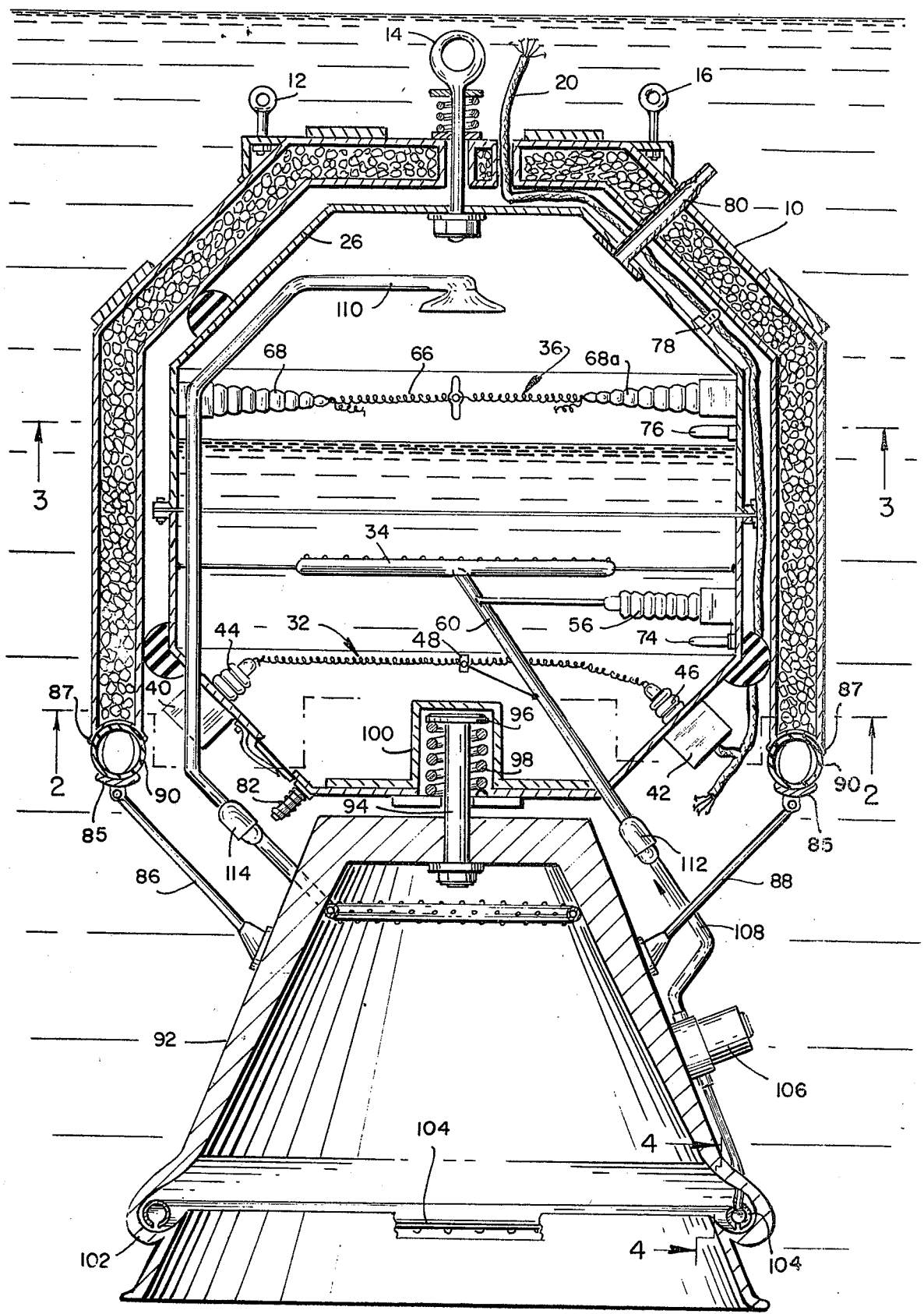
FIG. 1 is an elevation in section of the imploder system.
Figure 2:
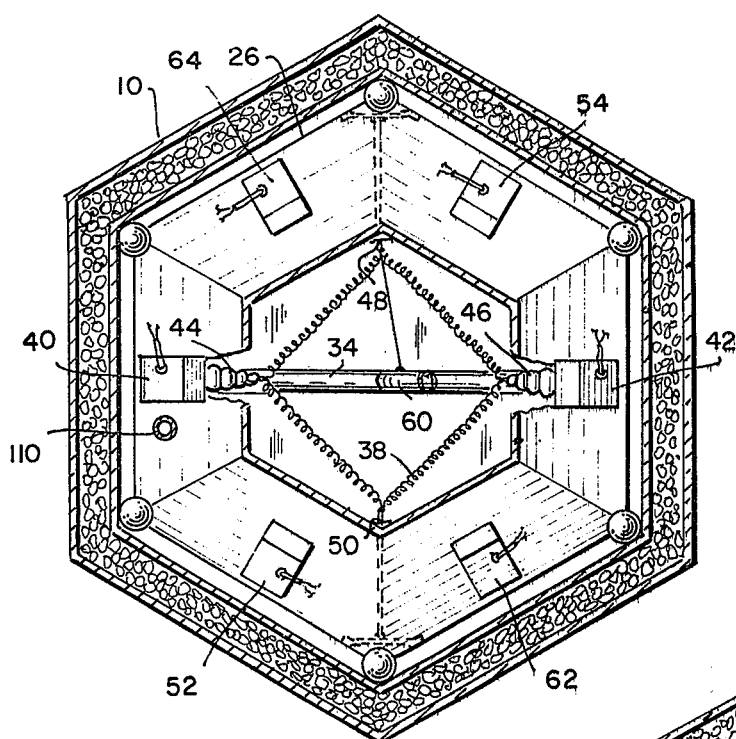
FIG. 2 is a section taken on the line 2—2 of FIG. 1.
Figure 3:
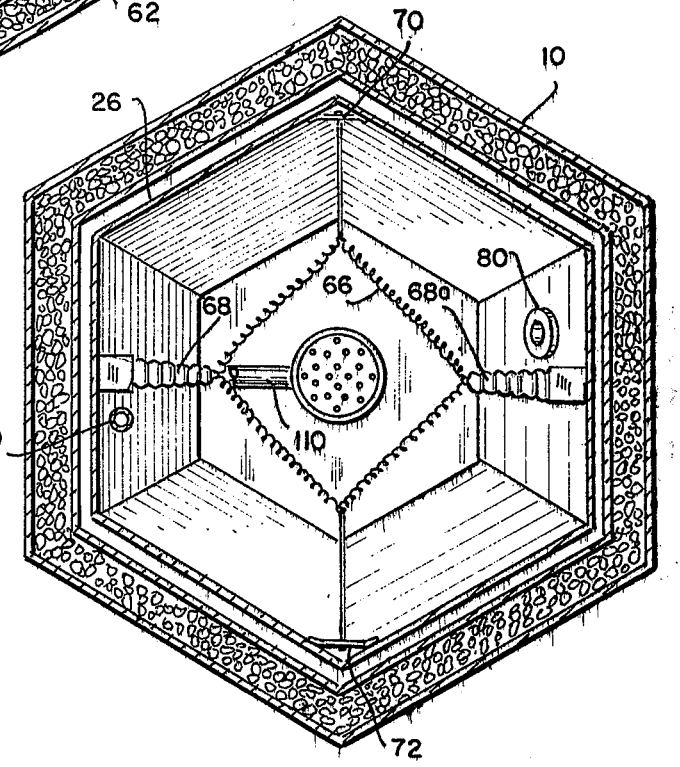
FIG. 3 is a section taken on the line 3—3 of FIG. 1.
Figure 4:
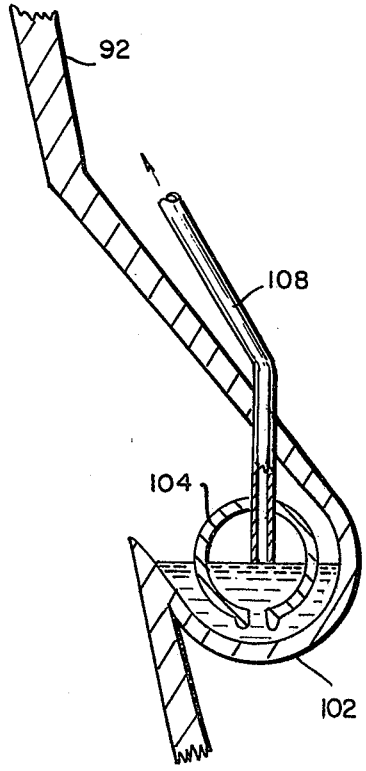
FIG. 4 is a section taken on the line 4—4 of FIG. 1.

Referring to the drawings heat shield 10 is suspended under the surface of the water by a suspension cable (not shown) connecting a surface vessel to eyebolts 12, 14 and 16 extending from the heat shield, a wire cable 20 extending through the top of the shield for supplying power to the imploder as explained below. The shield 10 is double walled and filled with an oil and gravel mixture which as poor conductors will virtually confine the heat within the shield where boiler 26 is located.

The boiler 26 is suspended directly by the cable connected to eyebolt 14 which is secured by a lock nut to the top of the boiler. The latter contains three heaters, viz; preheater 32, heater 34 and superheater 36. The preheater 32 has electrical elements 38 the ends of which are electrically connected to 10 KW transformers 40 and 42 through insulated conductors 44 and 46, respectively, the elements being grounded at 48 and 50 on the chassis of the boiler. The transformers are supplied by means of the cable 20.

Parallel connected transformers 52 and 54 are connected by insulated conductor 56 to hollow electrode conduit 60 which is in fluid conducting communication with perforated heater 34 which is connected to the transformers by insulated conductor 58 and is also grounded on the chassis at connecting point 50.

Transformers 62 and 64 are connected to the electrical elements 66 of the superheater 36 through insulators 68 and 68a, the elements being grounded at points 70 and 72 on the chassis.

The assembly is provided with temperature measuring devices 74 and 76 inside the boiler and a sensor 78 on the inside of the shield near its top. The devices are preferably in the form of thermocouples which are read on the surface vessel by instruments connected to the sensors through the cable 20, there being provided an automatic power cutoff in case of overheating.

The boiler has a fresh water filler valve 80 and a solenoid operated discharge valve 82 for periodically flushing out sediment collected in the bottom.

The shield is also supported on the top rim 85 of brackets 86 and 88, the bottom edge of the shield providing an opposing rim 87. A bell stabilizing tire 90 is disposed between the rims. The brackets are attached to the sides of imploder bell 92 which is suspended from the boiler by suspension bar 94 having a top cross member 96 supported on compression spring 98 in housing 100 located in the bottom of the boiler. The inside wall of the bell 92 is provided with a sump 102 having disposed therein ring 104 in which steam condensate is collected which is pumped into the heated electrode 60 of the boiler and passed through perforations in the heater 34 which is grounded on opposite sides of the boiler chassis. Pump 106 pumps the condensate from the ring 104 into the electrode 60 through conduit 108. It is seen that the sump 102 is an annular ring basin formed in the inner wall of the imploder 92. The purpose of the sump is to collect condensate converted from the steam on each implosion. The condensate water is substantially sweet which is collected by the perforated ring 102 disposed in the sump and expressed by means of the conduit 108 and pump 106 into the hollow electrode conduit 60 which is electrically heated, into the heated and perforated pipe 34 constituting the intermediate heater within the boiler.

Steam conduit 110 having an opening in the boiler above the superheater 36 leads the superheated steam into the bell 92 where steam bubbles are formed consecutively resulting in a series of implosions. The consequent vibrations of the bell 92 are creative of the desired sound waves which travel in all directions thereabout. The conduit 110 and the bell are provided with expansion and shock absorbers 112 and 114 to protect the equipment.

Various modifications of the invention may be effected by persons skilled in the art without departing from the scope and principle of the invention as defined in the appended claims.

What is claimed is:

1. A deep water sound imploder comprising a boiler, a heat shield disposed about said boiler, and an open ended imploder member suspended from said boiler and supporting said shield, and piping means connecting said boiler to said imploder member for introducing water condensate collected by said member into the boiler and passing steam generated by the boiler into said member.

2. A deep water sound imploder as defined in claim 1 wherein said imploder has an interior, annular sump and a perforated ring disposed in the sump, and said piping means includes a first conduit and pumping means for expressing condensate from the sump to the boiler said first conduit being electrically heated hollow conduit.

3. A deep water sound imploder as defined in claim 2 wherein a non heat conducting material is disposed in the space between said shield and said boiler.

4. A deep water sound imploder as defined in claim 3 wherein there is provided an electrically operated heater comprising a perforated tubing in communication with said first conduit.

5. An imploder as defined in claim 4 wherein said boiler is provided with an electrically heated preheater and superheater and said piping means includes a second conduit having an opening proximate said superheater.

6. An imploder as defined in claim 5 wherein shock absorbers are provided in said conduits as protection therefor.

7. An imploder as defined in claim 6 wherein temperature sensors are provided on said shield and in said boiler and a cable to said sensors adapted to be connected to recording devices.

8. An imploder as defined in claim 7 wherein said heaters are electrically connected to transformers powered by said cable.

* * * * *